July 30, 1935.  A. J. BRAUER ET AL  2,009,471
APPARATUS FOR GRADING AND MARKING LASTS
Filed Nov. 19, 1932  4 Sheets-Sheet 1
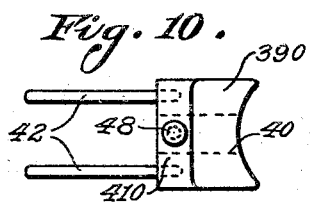
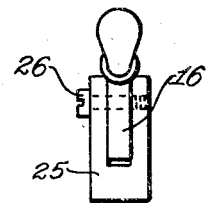
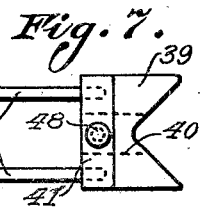
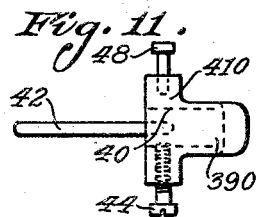
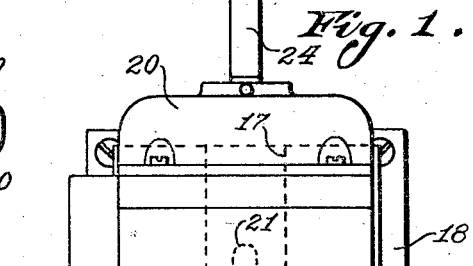
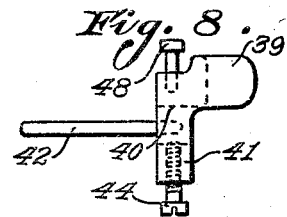
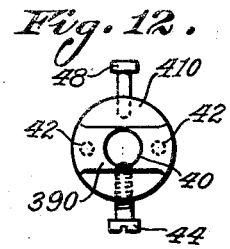
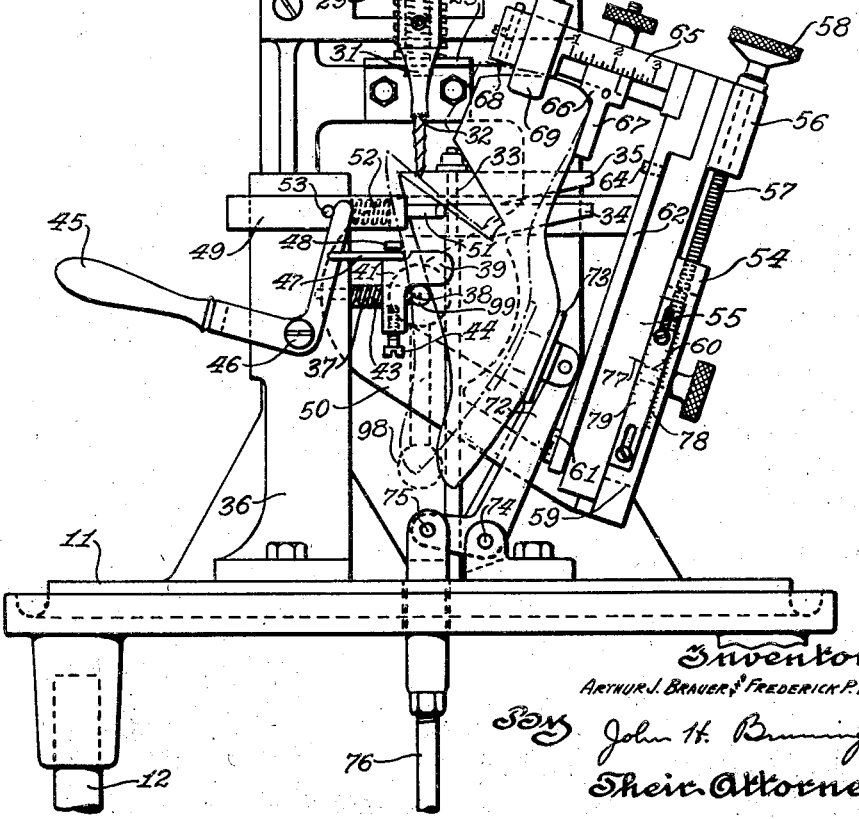
Inventors:
Arthur J. Brauer & Frederick P. Wagner,
by John H. Bruninga
Their Attorney

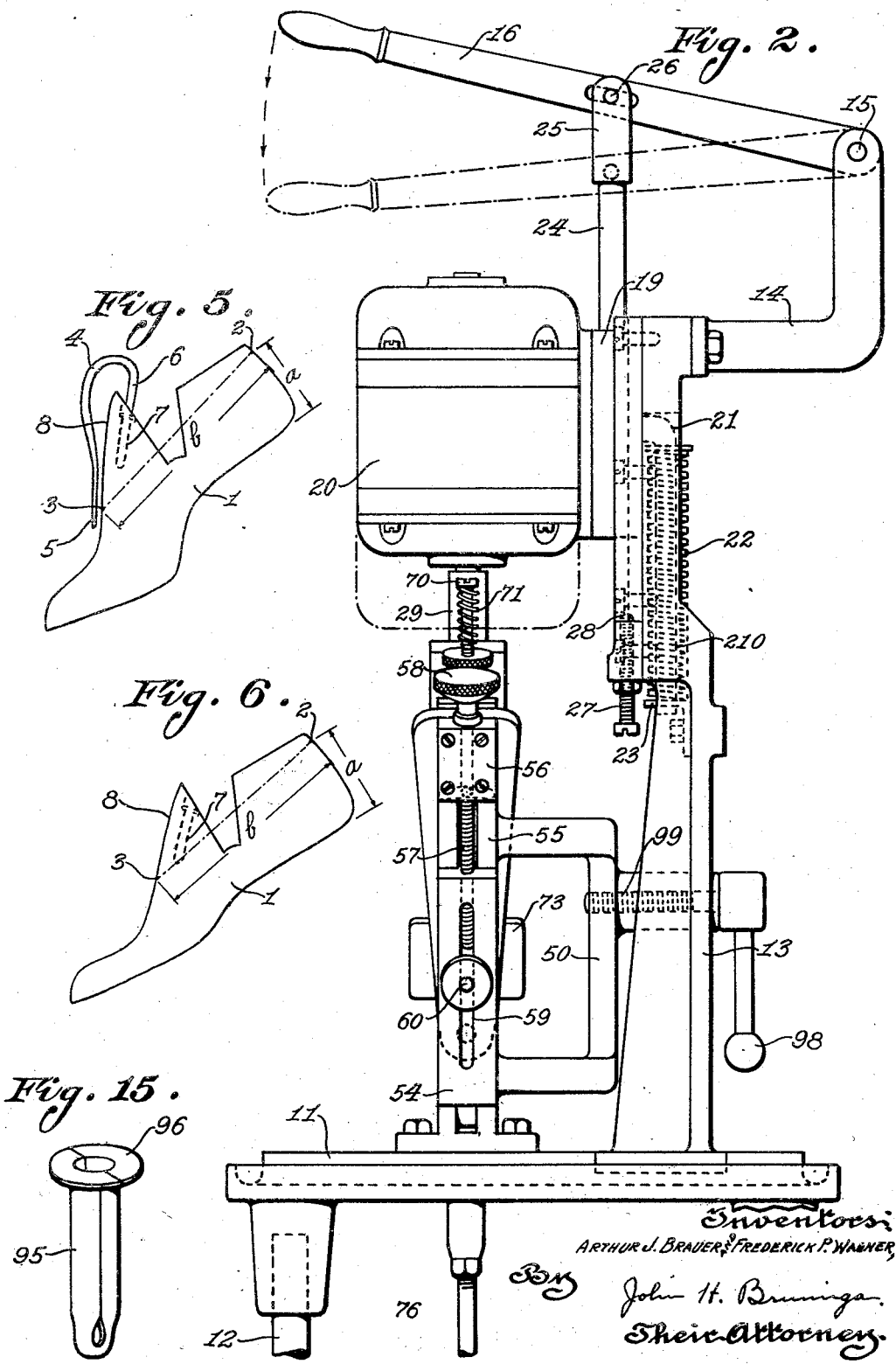

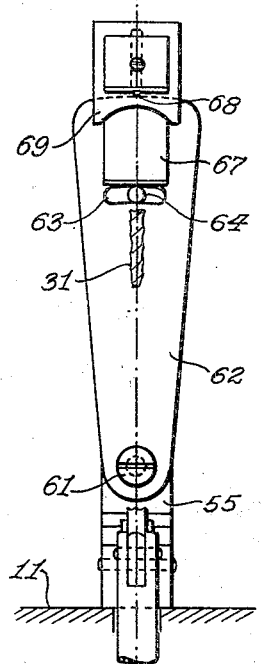
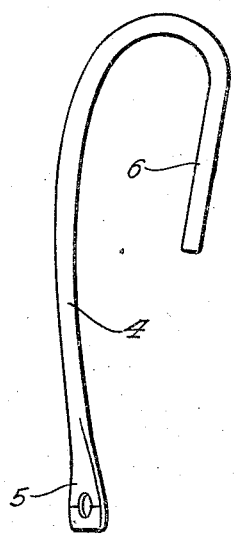
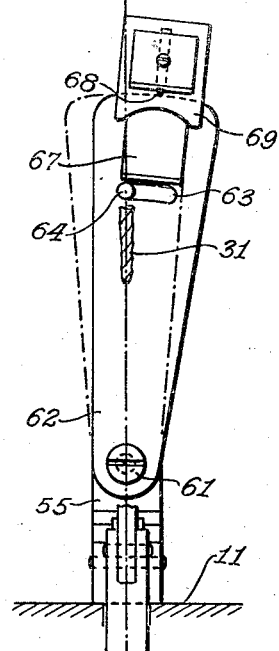
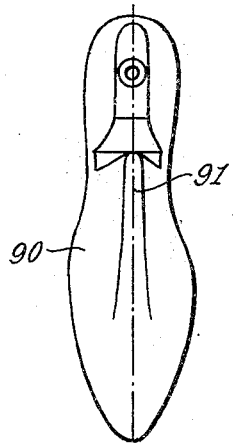
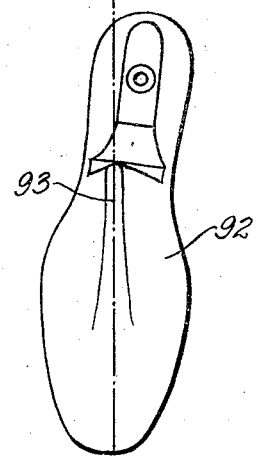
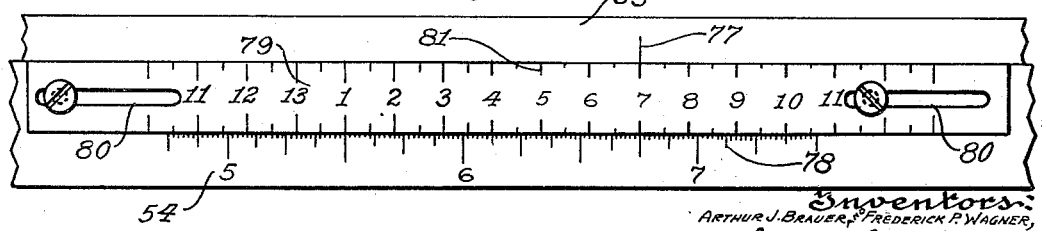

July 30, 1935.  A. J. BRAUER ET AL  2,009,471
APPARATUS FOR GRADING AND MARKING LASTS
Filed Nov. 19, 1932   4 Sheets—Sheet 4

Inventors:
ARTHUR J. BRAUER, & FREDERICK P. WAGNER,
John H. Bruninga
Their Attorney.

Patented July 30, 1935

2,009,471

UNITED STATES PATENT OFFICE 2,009,471

APPARATUS FOR GRADING AND MARKING LASTS

Arthur J. Brauer and Frederick P. Wagner, St. Louis, Mo., assignors to Brauer Bros., Inc., St. Louis, Mo., a corporation of Missouri Application November 19, 1932, Serial No. 643,372

19 Claims. (Cl. 144—3)

This invention relates generally to a machine for grading and marking or gauging lasts for use in the manufacture of shoes in such manner as to facilitate proper alinement of a shoe upper on lasts so gauged and marked. This application is in part a continuation of our prior co-pending application Serial No. 628,856, filed August 15, 1932, issued as Patent No. 1,985,310, December 25, 1934.

In the manufacture of shoes using lasts graded and gauged in accordance with the procedure set forth in our prior co-pending applications just referred to, reference points are established on lasts and so arranged as to facilitate proper alinement of an upper on a last so as to regulate the length of the opening. In grading and gauging the lasts in accordance with the prior applications a suitable point of reference is established at the back of the last to indicate the back height of a shoe and a coordinated point of reference is established on the cone of a last to indicate the throat line of a shoe. By concurrently employing such points of reference the desired length of the opening in shoes lasted thereon is readily and accurately obtainable.

In the co-pending applications referred to alternate methods of establishing a throat line mark on a last are disclosed. On lasts which are to be used for the manufacture of shoes such as pumps wherein there are no parts which extend upwardly beyond the throat line to obscure a mark on the last, such point of reference may be established by a suitable mark or a series thereof on the cone which may be in the form of a plate attached directly to the last. In the manufacture of shoes such as oxfords, however, where shoe parts extend upwardly beyond the throat line and would, therefore, obscure such a series of marks, as just referred to, a remote point of reference is established so as to be accessible when an upper is in position on the last, and a suitable instrument or templet may be provided for cooperating with such remote point of reference and adapted to extend into a position where it will operate to gauge the throat line position.

In a convenient form of the latter alternative a hole may be bored into the cone of the last and substantially axially thereof, a suitable socket fitted in the hole and accurately positioned in accordance with the size of the last and so arranged that when a templet is in engagement therewith, the gauging part of the templet will properly indicate the throat line of the last regardless of the size thereof.

The present invention relates particularly to a machine constructed and arranged so as to facilitate the grading or marking of lasts in accordance with either of the alternate forms just referred to. The machine of the present invention is particularly adapted to grade, clamp, and hold lasts, in accordance with the size and style thereof, accurately in position to be bored and for limiting the extent of the bore so as to accurately position such a remote point of reference. The machine is further adapted to grade and mark lasts where the gauge is to be applied directly to the cone. In either instance a mark is also made upon the back part of the last so as to establish the height of the back of the shoe.

In order to provide a machine for grading and marking lasts in the manner just described, and adapted for universal use on lasts of all styles and types, the present invention contemplates an arrangement whereby a last is automatically centered with reference to the marking or drilling elements so as to establish the points of reference thereon properly with reference to the curvature of the particular last.

The object of the present invention, generally stated, is to provide an apparatus for accurately controlling the position and extent of a bore hole extending axially of the cone of a last.

A further object of the present invention is to provide an apparatus for automatically centering the cone of a last with reference to a given axis regardless of the external curvature of the last.

Another object of this invention is to provide a last grading device wherein markers may be positioned in accordance with the size of a last to be graded and with reference to model size dimensions as a basis.

Other objects will become apparent to those skilled in the art when the following description is read in connection with the accompanying drawings, in which:

Figure 1 is a view in front elevation of a machine constructed in accordance with the present invention and showing a last in position therein.

Figure 2 is a view in side elevation of the machine shown in Figure 1.

Figure 3 is a detail view of a last support and gauge and showing the last support and gauge in relative position to a bit when a last having a medial cone is being operated upon.

Figure 4 is a detail view similar to Figure 3, but showing the parts in the relative position occupied when a last having an offset cone is being operated upon.

Figure 5 is a view in side elevation of a typical last for women's shoes showing a lasting gauge of the templet type in operating position thereon.

Figure 6 is a view in side elevation and a typical men's last.

Figure 7 is a detail plan view of a last positioning member adapted for use with women's lasts.

Figure 8 is a view in side elevation thereof.

Figure 9 is a view in end elevation thereof.

Figure 10 is a plan view of a last positioning member for use with men's lasts.

Figure 11 is a view in side elevation thereof.

Figure 12 is an end view thereof.

Figure 13 is a plan view of a gauge adapted to be applied directly to the cone of a last.

Figure 14 is a perspective view of a templet gauge adapted for positioning as shown in Figure 5.

Figure 15 is a perspective view of a socket adapted to be mounted in a last to receive the templet shown in Figure 14.

Figure 16 is a view on somewhat larger scale of an adjusting gauge shown in Figure 1.

Figure 17:
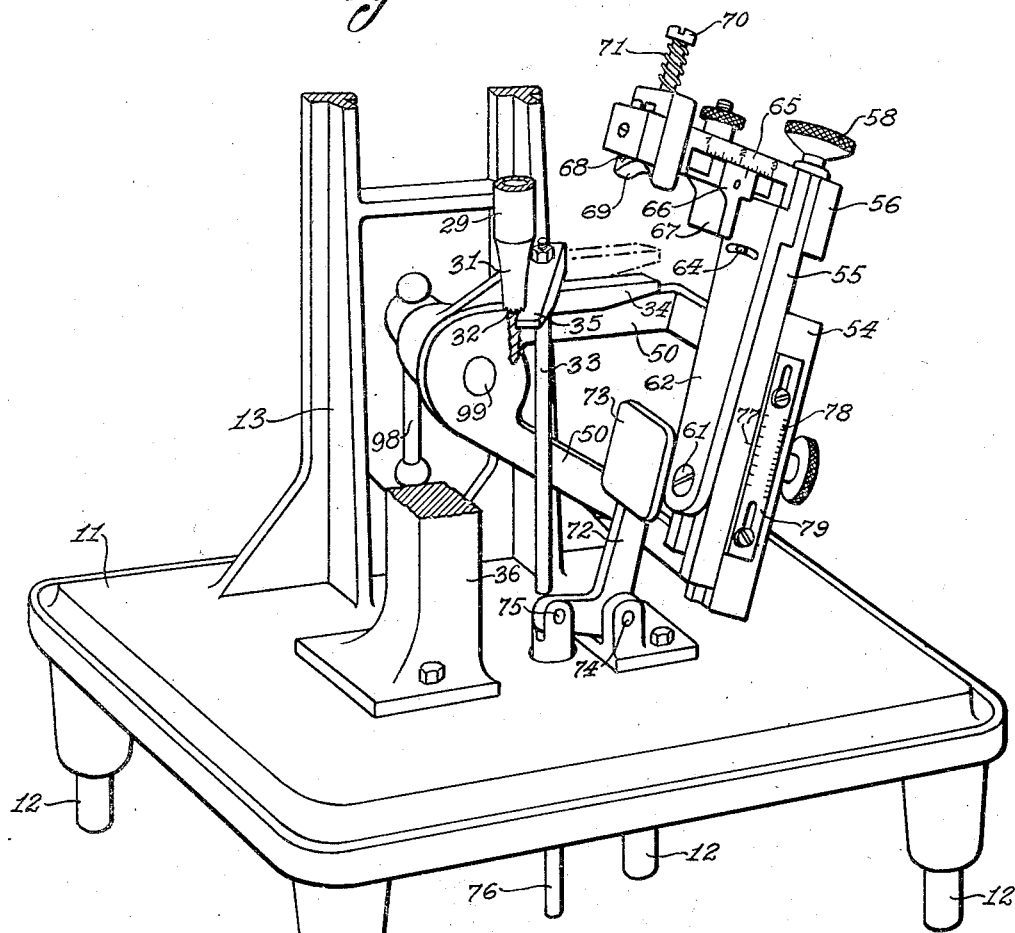
Figure 17 is a perspective view showing the machine illustrated in Figure 1 without a last in position therein.
Figure 18:
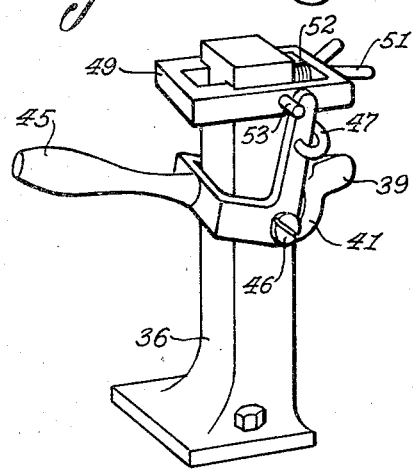
Figure 18 is a perspective view supplementing Figure 17 and showing fully a pedestal which is broken away in Figure 17.

As pointed out in our prior co-pending applications hereinbefore referred to, the opening length increment for each whole size variation of a shoe is $\frac{1}{4}''$. Accordingly the increment per half size is $\frac{1}{8}''$ and this is true regardless of the type of shoe, whether men's, women's, youth's, child's or otherwise and has been determined mathematically from the conventional shoe size dimensions. Likewise the increment in back height of a shoe has been determined to be $\frac{1}{16}''$ per whole size or $\frac{1}{32}''$ per half size. As between lasts or shoes of different types as, for instance, men's or women's there are different basic dimensions each calculated with particular reference to the model size of that type shoe or last. In the case of men's shoes the model size is generally understood to be 7, while with women's it is generally understood to be 4. With the basic dimensions for the model sizes established, however, the increments for all styles and types are the same with reference to the opening length and back heel height, with which the present invention is particularly concerned. In accordance with the present invention, apparatus is provided for the establishment of reference points on a last by which the proper back height and opening length of a shoe last thereon may be gauged. The present invention contemplates a gauging device, the marking elements of which are adapted to be set in accordance with the size of the last to be operated upon and with reference to the opening lengths of the model size of a corresponding type or style of shoe. The present invention further provides suitable means for automatically alining and maintaining in alinement a last to be graded while the reference points are being established thereon.

Referring now, particularly to Figure 5, there is illustrated at last 1 and the various dimensions to which reference will repeatedly be had hereinafter are indicated. Point 2 indicates the normal back height of a shoe to be lasted on the last 1, and point 3 indicates the normal throat line for such a shoe. If the last 1, be assumed to be for a woman's shoe of model size, that is size 4, the conventional back height indicated in Figure 1, as the distance $a$ may be 2''. The calculated opening length which is the distance from the top edge of the upper at the back of the shoe to the throat line is indicated as $b$ and may be calculated to be, for instance, $6\frac{1}{8}''$. The specific dimensions just given are for the purpose of illustration only and it will be understood that the same may vary in accordance with the choice of last of particular shoe manufacturer. With a last of the next higher size, that is size 5, of the type illustrated in Figure 5, however, the dimension $a$ will be found in accordance with the conventional practice to have increased $\frac{1}{16}''$, while the dimension $b$ will be found to have increased $\frac{5}{24}''$. These same increments apply to all size steps in all types of shoes.

In Figure 5, there is also shown a templet gauge 4 having a part 5 adapted to overlie throat line 3, when end 6 thereof is seated upon a remote point of reference which is accessible while an upper is in position on the last. In the embodiment shown the remote point of reference may be in the form of a bore hole 7, extending axially of the cone of the last and substantially parallel to the crest 8 thereof as illustrated. Inserted in the bore hole 7 may be a suitable receptacle or socket adapted to receive end 6 of templet 4 and accurately positioning the same with reference to the last so that an indicant on end 5 will be properly positioned with reference to throat line 3. The foregoing is all fully described in co-pending application, Serial No. 628,856, filed August 15, 1932.

Referring now, particularly to Figures 1 and 2, an apparatus is shown wherein lasts may be graded in the manner above described and the reference points 2 and 3 readily established. Furthermore, the apparatus is adapted to maintain lasts in position to have the hole 7 bored therein, in the direction and to the extent desired within accurate limits.

A table 11 may be mounted upon suitable legs such as 12, and have mounted thereon a framework 13, having at its upper end a bracket 14, on which is pivotaly mounted at 15, a hand lever 16. Near its upper end the frame 13 is provided with a guideway 17, formed by trunnion bars 18, adapted to slidably receive a bracket 19 upon which may be suitably mounted an electric motor or other driving device 20.

Extending through guideway 17 is a shank 21 connected to bracket 19 and having a downwardly extended part 210. Surrounding the part 210 is a coil spring 22 having the lower end thereof seated upon a bracket 23 affixed to the frame 13 and with the upper end thereof seated against the horizontally extending part of the shank 21. With the arrangement just described it will be apparent that the force exerted by the spring 22 is effective to bias the bracket 19 with the attached motor 20 upwardly in guideway 17.

Suitably attached to the upper end of bracket 19 is a shank 24 having a bifurcated part 25 attached as by means of a pin and slot connection 26 to hand lever 16. Mounted at the lower end of guideway 17 is a suitable stop, preferably adjustable, which may be in the form of a screw 27, the end 28 of which extends into a position so as to limit the downward movement of bracket 19 in guideway 17. With this arrangement it will be apparent that when the hand lever 16 is drawn downwardly into position illustrated in broken lines in Figure 2, motor 20 and its adjunct parts will likewise be moved into the position shown in broken lines in Figure 2, or until the downward movement thereof is limited by the engagement of the lower end of bracket 19 with end 28 of screw 27.

Mounted upon a lower end of the shaft of motor 20 may be a suitable chuck 29 adapted to receive a drill 31. When it is intended to insert sockets such as that shown in Figure 15 in the hole drilled in the cone of the last, the drill 31 may be of a type having a shoulder 32 of a diameter greater than that portion of the drill ahead of the shoulder so as to counterbore the bored hole. Rotatably mounted upon the shaft 33 may be a plurality of gauges such for instance as 34 and 35. Such gauges as 34 and 35 may be so positioned relatively to table 11 as to correspond accurately to the proper depth for the counterbore, for women's and men's lasts respectively. It will be understood that when the machine is to be adjusted for the drilling of men's lasts, gauge 35 may be turned at right angle to the position illustrated in Figure 1, so that the end thereof lies adjacent to drill 31. The drill may then be adjusted, as for instance by adjusting screw 27 until shoulder 32 is properly positioned with reference to gauge 35 when the drill is at the lower limit of its travel as shown in Figure 17.

Mounted upon the table 11 is a standard 36 having an element 37 rigidly mounted thereon. The element 37 is pointed at its other end as shown at 38, so as to pierce or mark a last which is forced against it. In the embodiment shown in drawings the axis of element 37 lies in a common plane with the axis of drill 31 for a purpose to be later described.

Removably mounted in slidable relation on element 37 is a last engaging member in the form of a saddle 39. As clearly shown in Figure 7, saddle 39 is forked to an extent substantially corresponding to a curvature at the crest of the cone of a woman's last. The saddle 39 is carried by a collar 41 having a central opening 40 through which element 37 may extend. A pair of guide bars 42 is also carried by collar 41, and these are adapted to be slidably received by corresponding openings in pedestal 36 on either side of element 37. Suitable coil springs such as 43 may be mounted upon bars 42 so as to bias saddle 39 outwardly from pedestal 36 and a set screw and other limiting device 44, which may operate in a groove in element 37, may be provided to prevent springs 43 from forcing the collar completely off element 37.

A hand lever 45 may be pivotally mounted, as at 46, upon pedestal 36 and may be suitably connected through a link 47 to a pin 48 on collar 41. It will be understood that when the hand lever 45 is moved in a counter clockwise direction as shown in Figure 1, the saddle 39 will be drawn inwardly against the action of springs 43. When in normal position, however, the saddle 39 may be so disposed as to prevent engagement of point 38 with a last.

In Figures 10, 11 and 12 there is illustrated a saddle 390, the shape of which is slightly different from the shape of saddle 39, so as to adapt it more particularly for men's lasts. Saddle 390 is mounted upon a collar 410 and as shown, by Figures 11 and 12, may be mounted centrally of the collar if desired. Otherwise the construction and operation of the saddle shown in Figures 10, 11 and 12 is the same as that previously described with reference to Figures 7, 8 and 9.

Embracing the upper end of pedestal 36 is a stirrup 49, having at the end thereof a pair of prongs 51 adapted to extend on either side of the cone of a last. A suitable coil spring as 52 may be provided for biasing the stirrup 49 to the right, and the stirrup is connected as through a pin 53 for operation by hand lever 45.

Saddle 39 together with prongs 51 form the yieldable elements of a last support arranged when in normal position to support a last in the position shown in full lines in Figure 1, it being noted that the point 38 of element 37 is out of contact with the cone of the last. The other elements which form part of the last support will now be described.

Suitably journaled upon frame 13 is a cradle 50 having a horizontal axis 99 alined with point 38 as shown in Figure 1 so that the parts carried by the cradle 50 may be moved about point 38 as a center. A suitable clamp having an operating lever 98 may be provided for clamping cradle 50 in any desired position. At its outer end cradle 50 carries an arm 54 upon which is adjustably mounted a slide 55. The slide 55 may be connected to arm 54 as by means of a sleeve 56 in which is screw shaft 57. The screw shaft 57 may engage an internally threaded part of arm 54. The screw shaft 57 is provided with a knurled head 58 and by this arrangement it will be understood that upon rotation of head 58 slide 55 will be adjusted longitudinally relative the arm 54. Arm 54 may be provided also with a vertically extending slot 59 through which a clamping screw 60 may extend so as to clamp the slide relative to arm 54.

Near the lower end of slide 55 is a pin 61 upon which is pivotally mounted an arm 62 so as to be in floating relation relatively to slide 55 and arm 54. This construction is clearly shown in Figures 3 and 4. Arm 62 may be provided with an arcuate slot 63 through which may extend a guide pin 64 carried by slide 55 so as to guide and limit the floating movement of arm 62.

Extending outwardly from the upper end of arm 62 is a rail 65 having mounted near one end thereof and in adjustable relation thereto a slide 66 having a plate 67 adapted to provide a seat for the heel end of a last as shown in Figure 1. On the other end of rail 65 is a pointed element 68 arranged to pierce or mark a last which is forced into contact with it. There may also be provided if desired, on rail 65 a last engaging member 69 arranged in a manner similar to saddle 39 so as to engage opposite sides of the back of the last. Member 69 may be yieldably mounted as upon stem 70 having a coil spring 71.

In order to clamp a last in position with reference to the elements of the last support which have been described, a lever 72 having pivotally mounted, on one end thereof, a plate 73 adapted to engage the bottom of the forepart of a last as shown in Figure 1, may be provided. In the embodiment illustrated lever 72 is in the form of a bell crank centrally fulcrumed at 74 and having the other arm thereof connected as at 75 to a link 76 which may be operated by a treadle or hand lever not shown. With the arrangement just described it is apparent upon movement of the link 76 downwardly plate 73 will operate to force last 1 into the position illustrated in Figure 1 by broken lines. This movement, of the last 1, will be against the resistance yieldable elements 39, 51 and 69, and will be such as to bring the elements 37 and 68 into piercing or marking engagement with the surface of the last. After the yieldable elements have been displaced and the surface of the last brought into firm engagement with elements 37 and the surface of rail 65 adjacent to member 69, it is apparent that the last will be clamped with sufficient rigidity to permit the drill 31 to be operated to form the bore hole 7, as illustrated in Figures 5 and 6.

From an inspection of Figures 1 and 5, it will be apparent that the indentations or marks made by the points of elements 37 and 68 correspond respectively to the throat line position 3 and the back height position 2. By relative adjustment of the points of markers 38 and 68, it is apparent that the apparatus shown in Figure 1 may be employed so as to gauge and indicate on a last the throat line and back height positions, it being understood that the distance between point 38 and the point of element 68 corresponds with allowance for indentation to the opening length $b$ of a shoe.

A suitable gauge may therefore be provided to operate between arm 54 and slide 55, for indicating the position of the parts. It will be understood that any suitable scale may be employed as, for instance, a scale indicating the distance in inches between points 38 and 68 when the parts are in a given position. In view of the fact, however, that the increment of opening length per one-half size variation in shoes is conventionally $\frac{5}{48}''$ the variations of such scale are necessarily extremely close together and to this extent such scales are impractical unless magnifying glasses are provided and skilled operators employed. In the embodiment illustrated in Figures 1 and 16, the scale is arranged so that the slide 54 may be set by sizes, after one original setting so that the necessity for reading close graduations is thus avoided so long as the type of last remains the same. As shown in Figures 1 and 16, an indicant 77 may be etched or otherwise established on slide 55. On the adjacent surface of arm 54 is a scale 78 indicating the distance in inches between points 38 and 68, such scale being graduated to forty-eighths of an inch. Also mounted on standard 54 and in position to cooperate concurrently with indicant 77 and scale 48 is an independently movable scale 79. The scale 79 may be slidably mounted upon arm 54 in any convenient manner as for instance through pin and slot connections 80 preferably so arranged that scale 79 may be clamped when once set into position. The scale 79 is graduated in sizes and half sizes for shoes, the distances between the whole size graduations corresponding to the increment of opening length increases per shoe size, namely $\frac{5}{24}''$.

With a scale such as that just described the opening length in the model size of a particular type of shoe may be selected on scale 78 and adjacent the selected graduation the model size of that particular shoe as appearing on the slidable scale 79 may be set. As long as lasts of the same type, that is lasts having the same basic or model size dimensions are being graded, slide 55 may be adjusted according to the size appearing on scale 79. That is to say the indicant 77 may be set adjacent the sizes or half sizes appearing on scale 79 to which the particular last to be operated upon corresponds. To illustrate more fully, the last 1 in the device, as shown in Figure 1, may be assumed to be a size 7 women's last. Universally size 4 is recognized as the model size for women's shoes and lasts. If then, the last 1 in the machine is of a type in which opening length for the size 4 is $6\frac{1}{8}''$ the procedure will be as follows: Set "4" on scale 79 adjacent the graduation corresponding to $6\frac{1}{8}''$ as is particularly shown in Figure 16. Then by manipulation of screw 57 slide 55 may be moved into a position where indicant 77 is alined with the "7" mark on scale 79. When the parts are in this position the distance between points 38 and 68 will be according to the illustration $6\frac{1}{8}''$, (opening length of model size) plus 3 (size steps between model size and size 7) times $\frac{5}{24}''$ (the opening length increment per size). Thus the distance between points 38 and 68 when the apparatus is set for a size 7 women's shoe, of a type having an opening length of $6\frac{1}{8}''$ in the model size, is $6\frac{3}{4}''$. The scale illustrated in Figure 16, however, is so arranged that the operative is not required to compute the opening length of any particular size, once the scale 79 has been set with reference to scale 78, and so long as the type of last being operated upon remains unchanged.

In view of the fact that there is some variation in the back height or distance $a$ indicated in Figure 5, there is provided an inch scale on rail 65 which is adapted to cooperate with an indicant on slide 66. The inch scale on rail 65 cooperates with the indicant on slide 66 to show the distance between point 68 and the surface of plate 67 against which the heel end of a last will be seated.

From the foregoing description the operation of the device of the present invention will be understood to be as follows, assuming the gauge illustrated in Figure 16 to be in the position shown and that the next last to be operated upon is a size 5 of the type, the basic dimensions for which are already set: Screw 57 may be manipulated to bring indicant 77 into alinement with the "5" graduation 81 on scale 79. The indicant on slide 66 may then be set at $2\frac{1}{16}''$ for instance which will be the corresponding back height for this last. Hand lever 45 may then be pressed downwardly so as to draw the last engaging elements 39 and 51 toward the left as seen in Figure 1. With the parts in this position the heel end of a last may be slipped in between the jaws of member 69, with the heel plate resting upon the surface of plate 67. Handle 45 may be released whereupon the last will be forced by the action of springs 43 and 52 to the right against plate 73, so that it will occupy the position shown in full lines in Figure 1. Now upon movement of the clamping device 72 in a counter-clockwise direction the last will be firmly clamped between plate 73 and point 38 of element 37, the jaws of the last engaging elements 39, 51, however, operating to steady the last. Upon operation of the clamp member 72, the last will be moved into the position indicated in broken lines in Figure 1. With the last in this position and with cradle 50 properly adjusted it will be apparent that the axis of drill 31 is substantially parallel to the crest 8 of the cone of last 1. The term crest as used herein will be understood to mean the highest point in the curved surface of the cone of the last.

With the last so clamped the motor 20 may be set into operation so as to drive drill 31 whereupon an operative by pulling downwardly on lever 16 may force drill 31 into the cone of the last so as to form the bore hole 7. It will be understood that lever 16 will be pulled down until further downward movement of the motor carriage is arrested as by stop 28 at which time the depth of the bore hole will be accurately determined with reference to point 38 and with proper adjustment of slide 55 relative to scale 79 the distance between the bottom of bore hole 7 or the shoulder of the counterbore therein will be the same for every size last unless the setting of stop 28 is changed.

In view of the fact that in many lasts particularly men's lasts the element of the cone surface which corresponds to the crest of the cone is not parallel to the general longitudinal axis of the last, the last support of the present invention has been arranged to automatically assume a position wherein the longitudinal axis of the cone will be in prolongation of the axis of drill 31. This is particularly illustrated in Figures 3 and 4. In Figure 3, the position of arm 62 relative to slide 55 and drill 31 is shown in connection with a last 90 having a cone, the longitudinal axis 91 of which extends in the same general direction of the longitudinal axis of the last.

In Figure 4 the arm 62 is shown in a position, which will be assumed when a last 92, having an offset cone is inserted therein and hand lever 45 released. As indicated in Figure 4, the longitudinal axis 93 of the cone of last 92 deviates from the general longitudinal axis of the last but when inserted in the apparatus shown in Figure 1 members 51 and 39 straddle the cone of the last and automatically move arm 62 into the position shown in full lines where the longitudinal axis 93 of the cone of the last, regardless of what the deviation from the general longitudinal axis of the last may be, is in prolongation with the axis of the drill 31, as shown.

Regardless of the direction in which the longitudinal axis of a cone of a last may extend the mounting of arm 62 is operative to automatically bring such axis into a position where it is in prolongation with the axis of drill 31. This is accomplished by the floating relation or pivotal mounting of arm 62 upon the slide 55 in conjunction with the action of saddle 39 and prongs 51, each of which straddle the crest of the cone of the last and thereby determine the general direction in which the cone axis thereof extends. It will be understood that arm 62 will adapt itself to the direction of the longitudinal axis of the cone immediately upon insertion of a last in the support, and release of hand lever 45 will exert the force of springs 43 and 52 in such a manner as to bias the last and arm 62 into proper positions. Upon operation of the clamping member 72, however, the alinement established and position assumed by arm 62 will be understood to remain unchanged. As used in the foregoing description and in the appended claims, it will be understood that the expression "longitudinal axis of the cone" is intended to mean a line substantially parallel to that element of the cone of the last which forms its crest, which line is substantially equidistant from the side surfaces of the cone. In other words, the longitudinal axis of the cone extends in the same direction as the crest of the cone and is centrally located within the cone.

From the foregoing description it will be understood that the points of elements 38 and 68 mark the last in such manner as to indicate reference points by which the throat line and back height of an upper thereon may be gauged. If it is desired to employ a gauge such as that illustrated in Figure 13, the same may be driven into the cone using the indentation formed by point 38 to position one prong of the gauge or otherwise to locate the gauge relative to the proper throat line position. In the use of such gauges as shown in Figure 13, it will be understood to be unnecessary to drill a bore hole axially of the cone of the last in the manner hereinbefore described.

However, in grading of lasts thereon shoes of a type such as oxfords in which the materials extend upwardly beyond the throat line, gauges of the type illustrated in Figure 14 and shown in Figure 5 are employed. As hereinbefore pointed out the manufacture of shoes of this type requires the establishment of a throat line reference point which will be accessible while an upper is in position on the last. This may be conveniently accomplished by drilling the bore hole 7 by means of the drill 31 as hereinbefore described, and subsequently inserting therein a suitable receptacle or socket 95 such as that illustrated in Figure 15. The socket illustrated in Figure 15 is provided with a flange portion 96 which may be seated on the shoulder of a counterbore but it will be understood that the flange 96 may be dispensed with when the sockets can be accurately otherwise positioned. In the installation of such sockets as that illustrated in Figure 15, it will be understood that although the same size sockets are employed for all sizes and types of lasts, the depth of the counterbore which receives flange 96 may be regulated to position the socket accurately with reference to throat line position on a particular size and type of last. A templet such as 4 may then be employed with all lasts so equipped for gauging the throat line position of an upper, it being understood that the same templet may be employed, if desired, on all types and sizes of lasts for indicating the throat line position thereon. Differences in opening length of various types and sizes are compensated for by the position of socket 95 the depth of which is determined in accordance with the size of the last and with reference to the basic dimensions for the particular type.

From the foregoing description it will be apparent that many modifications of the apparatus hereinbefore described will present themselves to those skilled in the art without departing from the spirit of this invention. It is to be distinctly understood therefore, that the invention is not limited to the specific details hereinbefore described and shown in the accompanying drawing but that the use of such individual features and sub-combination of features as do not depart from the spirit of this invention are, although not specifically described herein, contemplated by and within the scope of the appended claims.

Having thus described the invention, what is claimed is:

1. A device of the kind described comprising a drill, and last clamping means disposed to straddle the cone and engage the surface of the last to maintain the longitudinal axis of the cone in prolongation with the drill.

2. A device of the kind described comprising a stationary piercing element disposed to engage the cone of a last, a last positioning member adjustable relative said element, and means for forcing a last against said piercing element.

3. A device of the kind described comprising a movable drill, a guide for said drill, and means for supporting lasts to be drilled, said supporting means having a stationary piercing element and means for forcing a last against said piercing element.

4. A device of the kind described comprising a movable drill, a guide for said drill, means for limiting the movement of said drill, and means for supporting lasts to be drilled, said supporting means having a stationary piercing element and means for forcing a last against said piercing element.

5. A device of the kind described comprising a stationary piercing element disposed to engage the cone of a last, and cone guiding means arranged to engage the last at spaced points adjacent the cone and aline the crest of the cone with said piercing element.

6. A device of the kind described comprising a stationary piercing element disposed to engage the cone of a last, cone guiding means for alining the crest of the cone with the piercing element but normally positioned to maintain the last out of engagement with said piercing element, and means engageable with the last bottom operable to force the last against the piercing element.

7. A device of the kind described comprising a cone marking element, a member for marking the back height on a last, means for adjusting said member relative said element in accordance with the opening length of a shoe to be made on the last, a last support normally maintaining a last out of engagement with said markers but yieldable to permit concurrent engagement thereof.

8. A device of the kind described comprising a cone marking element, a member for marking the back height on a last, means for adjusting said member relative said element in accordance with the opening length of a shoe to be made on the last, a yieldable last support normally maintaining a last out of engagement with said markers, and means for forcing a last into engagement with said markers.

9. A device of the kind described comprising a drill, a floating last support having members arranged to engage opposite sides of the cone of a last and bias the same into a position whereat the crest of the cone lies in a plane common with the axis of the drill.

10. A device of the kind described comprising a drill, a floating last support having members arranged to engage opposite sides of the cone of a last and bias the same into a position whereat the crest of the cone lies in a plane common with the axis of the drill, and clamping means arranged to hold a last so that the crest of the cone thereof is substantially parallel to the axis of the drill.

11. A device of the kind described comprising a cone marking element, a member for marking the back height on a last, means for adjusting said member relative said element in accordance with the opening length of a shoe to be made on the last, a last support normally maintaining a last out of engagement with said markers but yieldable to permit concurrent engagement thereof, and a drill mounted for movement substantially parallel to crest of the cone when the last is engaged by said markers.

12. A device of the kind described comprising a drill, and a last support having a resilient clamping member adapted to bias the cone of a last into centered relation with said drill and hold the same thereat.

13. A device of the kind described comprising a drill, a last support having a resilient clamping member adapted to bias the cone of a last into centered relation with said drill and hold the same thereat, and means for moving said drill axially into the cone for a limited distance.

14. A device of the kind described comprising a stationary marker, a movable marker adjustable relative thereto, and a gauge for positioning said markers in accordance with the size last to be marked and with reference to the model-size opening length of a corresponding shoe.

15. A device of the kind described comprising a stationary marker, a movable marker adjustable relative thereto, and a gauge for positioning said markers having a stationary scale indicating the distance between said markers, an indicant cooperating therewith and movable with said movable marker, and an independently movable scale intermediate said stationary scale and indicant, the latter scale being graduated in size increments.

16. A device of the kind described comprising a stationary marker, a movable marker adjustable relative thereto, a gauge for indicating the relative positions of said markers having a scale graduated in shoe size increments and an indicant cooperating with the scale and movable with the movable marker.

17. A device of the kind described comprising a drill, a floating last support having yielding members arranged to engage the surface of a last and automatically adjust the support, relatively adjustable pointed elements normally held out of engagement with a last, clamping means arranged to move a last into engagement with said elements against the action of said yielding members, and a gauge for relatively positioning said elements in accordance with the size of the last to be operated upon, and with reference to the opening length of a corresponding model size.

18. A device of the kind described comprising a stationary piercing element disposed to engage the cone of a last, a last supporting cradle rotatable about the piercing element, a last positioning member carried by said cradle and adjustable relative to said piercing element, and means for forcing a last against said piercing element.

19. A device of the kind described comprising a stationary piercing element disposed to engage the cone of a last, a piercing element adjustable to vary the distance between the same and the stationary piercing element, and means for moving said adjustable piercing element about the stationary element as a center.

ARTHUR J. BRAUER.
FREDERICK P. WAGNER.